United States Patent
Chapiewski et al.

(10) Patent No.: US 11,343,145 B2
(45) Date of Patent: May 24, 2022

(54) DYNAMIC TRACKING DEVICE RECONFIGURATION

(71) Applicant: Tile, Inc., San Mateo, CA (US)

(72) Inventors: Guilherme de Barros Chapiewski, Cupertino, CA (US); Michael George Farley, Foster City, CA (US); Josselin de la Broise, Mountain View, CA (US); Mayank Kumar, San Francisco, CA (US)

(73) Assignee: Tile, Inc., San Mateo, CA (US)

( * ) Notice: Subject to any disclaimer, the term of this patent is extended or adjusted under 35 U.S.C. 154(b) by 0 days.

(21) Appl. No.: 16/899,499

(22) Filed: Jun. 11, 2020

(65) Prior Publication Data

US 2020/0304369 A1 Sep. 24, 2020

Related U.S. Application Data

(63) Continuation of application No. 16/810,845, filed on Mar. 6, 2020, which is a continuation of application No. 15/150,415, filed on May 9, 2016, now Pat. No. 10,623,249.

(51) Int. Cl.
*G06F 15/177* (2006.01)
*H04L 41/0816* (2022.01)
*H04B 1/3827* (2015.01)
*H04L 43/08* (2022.01)

(52) U.S. Cl.
CPC ....... *H04L 41/0816* (2013.01); *H04B 1/3833* (2013.01); *H04L 43/08* (2013.01)

(58) Field of Classification Search
CPC ..... H04L 41/0816; H04L 43/08; H04L 67/12; H04L 41/0681; H04B 1/3833; H04W 4/35
See application file for complete search history.

(56) References Cited

U.S. PATENT DOCUMENTS

| 8,254,868 | B2* | 8/2012 | Constien | G06F 1/3203 |
| | | | | 455/343.1 |
| 2014/0095091 | A1* | 4/2014 | Moore | G01R 31/3648 |
| | | | | 702/63 |
| 2014/0258744 | A1* | 9/2014 | Meyer | G06F 1/3203 |
| | | | | 713/320 |

(Continued)

*Primary Examiner* — Brian Whipple
*Assistant Examiner* — Tesfu N Mekonen
(74) *Attorney, Agent, or Firm* — Baker Botts L.L.P.

(57) ABSTRACT

In one embodiment, a method includes receiving, by a tracking server, tracking device diagnostic information and user device diagnostic information. The method includes retrieving, by the tracking server, a power consumption model for a tracking device based on the tracking device diagnostic information. The method includes revising, by the tracking server, the power consumption model for the tracking device based on the tracking device diagnostic information and the user device diagnostic information. The method includes determining, by the tracking server, reconfiguration instructions for the tracking device based on the revised power consumption model. The reconfiguration instructions are selected to cause the tracking device to satisfy one or more power conditions. The method includes providing, by the tracking server, the reconfiguration instructions to the tracking device.

20 Claims, 4 Drawing Sheets

(56) References Cited

U.S. PATENT DOCUMENTS

| | | | |
|---|---|---|---|
| 2014/0274225 A1* | 9/2014 | Lacatus | H04W 4/029 455/574 |
| 2016/0064955 A1* | 3/2016 | Zuerner | G07F 15/12 705/39 |
| 2016/0098081 A1* | 4/2016 | Takahashi | A61B 5/02416 340/5.51 |
| 2016/0133201 A1* | 5/2016 | Border | G06K 9/2018 345/694 |
| 2016/0234647 A1* | 8/2016 | Macdonald | H04W 4/027 |
| 2016/0360378 A1* | 12/2016 | Borowski | G01S 19/34 |

* cited by examiner

DYNAMIC TRACKING DEVICE RECONFIGURATION

CROSS REFERENCE TO RELATED APPLICATIONS

This application is a continuation of U.S. application Ser. No. 16/810,845, filed Mar. 6, 2020, which is a continuation of U.S. application Ser. No. 15/150,415, filed May 9, 2016, now U.S. Pat. No. 10,623,249, all of which is incorporated herein by reference in their entirety.

BACKGROUND

1. Field of the Disclosure

This disclosure relates generally to electronic tracking devices, and more specifically, to dynamically reconfiguring a tracking device based on usage information.

2. Description of the Related Art

Electronic tracking devices have created numerous ways for people to track the locations of people and/or objects. For example, a user can use GPS technology to determine a location of the device. In another example, a user can attach a tracking device to an important object, such as keys or a wallet, and use the features of the tracking device to more quickly communicate with the object, (e.g., if it becomes lost).

However, traditional tracking devices and corresponding systems suffer from one or more disadvantages. For example, battery life of a tracking device is often limited. Traditional tracking devices broadcast advertisement packets at a predetermined frequency. Broadcasting advertisement packets during periods of inactivity (e.g., while a user is sleeping) can unnecessarily drain the battery of a tracking device.

SUMMARY

A tracking device can be reconfigured after an amount of operation to preserve the battery capacity of the tracking device and to ensure that the tracking device can be operated for a pre-determined threshold period of time. For instance, in order to guarantee continuous operation off a single battery charge for one year, the tracking device can provide periodic status updates to a mobile device associated with the tracking device. The periodic status updates can include diagnostic information such as a current power capacity available to the tracking device via the tracking device battery.

The mobile device can provide the diagnostic information to a tracking server, which can estimate an expected remaining amount of operation time available to the tracking device based on the diagnostic information. In some embodiments, the estimate can be based on historical behaviors of the tracking device. The tracking server can then generate reconfiguration instructions to provide to the tracking device via the mobile device, and the tracking device can reconfigure itself accordingly. In some embodiments, the reconfiguration instructions are selected in order to ensure that the tracking device can continue to operate for at least a pre-determined minimum threshold amount of time.

Figure 1:
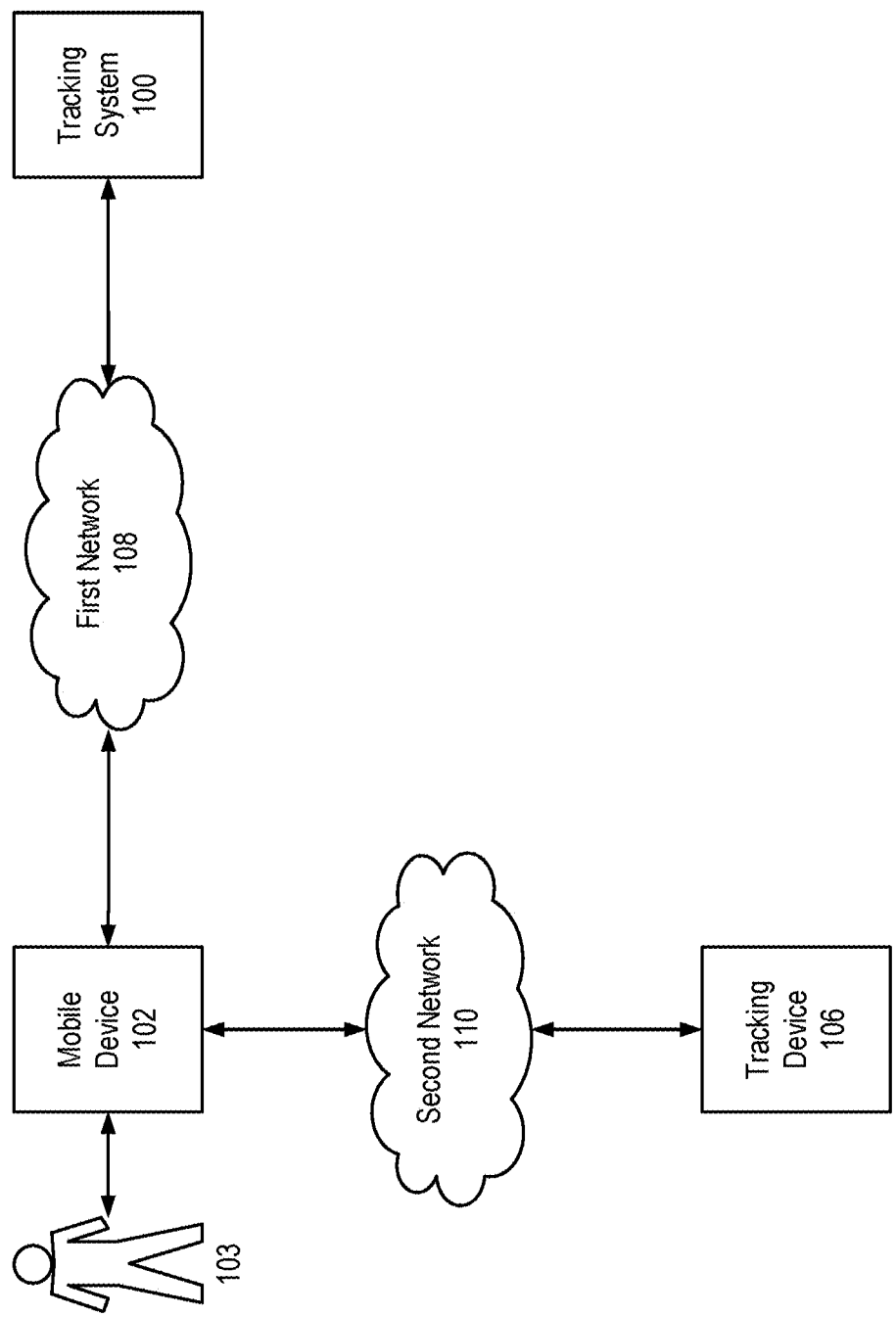
FIG. 1 illustrates an environment for use in dynamically adjusting parameters of a tracking device according to principles described herein.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Embodiments described herein relate to dynamically reconfiguring (or "adjusting configuration parameters of") a tracking device based on diagnostic information, including information related to the tracking device (e.g., tracking device diagnostic information) and/or information related to a mobile device/user (e.g., mobile device diagnostic information) associated with the tracking device to enhance a user's experience with an object associated with the tracking device.

The tracking device introduces features to the object associated with the tracking device (e.g., the object to which the tracking device is attached) not otherwise available to the object. For example, the user can attach the tracking device to or enclose the tracking device within the object, such as, for example, a wallet, keys, a car, a bike, a pet, or any other object that the user wants to track. The user can then use a mobile device (e.g., via a software application installed on the mobile device) to communicate with the tracking device and the corresponding object. For example, the mobile device can perform a local search for the tracking device attached to the near-by object.

The tracking device can have power constraints such as, for example, a limited battery life due to an inability to replace the tracking device battery. A tracking system (e.g., a cloud based service) can reconfigure parameters of the tracking device to account for the power constraints. In one example, the tracking system can reconfigure the tracking device to broadcast advertisement packets at a lower frequency, to emit a sound or a song at a lower volume, to emit light at a lower brightness, to vibrate at a lower setting for a shorter duration, etc., and thus increase the battery life of the tracking device. However, increasing the battery life of the tracking device by decreasing the functionality of the tracking device may adversely decrease the user's experience with the object associated with the tracking device. In another example, the tracking system can reconfigure the tracking device based on a power consumption model which takes into account the power constraints of the tracking device and the diagnostic information including the information related to the tracking device and/or the information related to the user (e.g., historical user information, available battery power information, etc.). The tracking system can periodically revise the power consumption model based on the change in diagnostic information. In this manner, the tracking system can optimize the tracking device based on the power constraint, the information related to the tracking device and/or the information related to the user and thus increase the battery life of the tracking device while personalizing the user's experience with the associated tracking device.

Environment Overview

FIG. 1 illustrates an environment for use in dynamically adjusting parameters of a tracking device 106, according to one embodiment. FIG. 1 illustrates a tracking system 100 communicatively coupled to a mobile device 102 associated with a user 103. As will be explained in more detail below, the tracking system 100 dynamically adjusts parameters of the tracking device 106 based on diagnostic information including information that characterizes the tracking device 106 (e.g., tracking device diagnostic information) and/or information that characterizes the mobile device 102 and/or the user 103 (e.g., mobile device diagnostic information). Although FIG. 1 illustrates a particular arrangement of the tracking system 100, the mobile device 102, the user 103, and the tracking device 106, various additional arrangements are possible.

The tracking system 100 and the mobile device 102 communicate via a first network 108. The tracking system 100 and the mobile device 102 can communicate using any communication platforms and technologies suitable for transporting data and/or communication signals, including known communication technologies, devices, media, and protocols supportive of remote data communications. The first network 108 can include one or more networks, including, but not limited to, wireless networks (e.g., wireless communication networks), mobile telephone networks (e.g., cellular telephone networks), closed communication networks, open communication networks, satellite networks, navigation networks, broadband networks, narrowband networks, the Internet, local area networks, and any other networks capable of carrying data and/or communications signals between the tracking system 100 and the mobile device 102.

The mobile device 102 and the tracking device 106 communicate via a second network 110. The second network 110 can be a similar or a different type of network as the first network 108. In some embodiments, the second network 110 includes a wireless network with a limited communication range, such as a Bluetooth or Bluetooth Low Energy (BLE) wireless network. In some configurations, the second network 110 is a point-to-point network including the tracking device 106 and one or more mobile devices (e.g., the mobile device 102) within a threshold proximity of the tracking device 106. Accordingly, any given mobile device (such as the mobile device 102) is only able to communicate with the tracking device 106 if it is within a threshold proximity to the tracking device 106. In other configurations, the second network 110 is a mobile telephone network including one or more mobile devices (e.g., the mobile device 102) and the tracking device 106. Accordingly, any given mobile device (such as the mobile device 102) can be able to communicate with the tracking device 106 regardless of proximity. In some configurations, the mobile device 102 can be associated with multiple tracking devices 106 associated with various users (e.g., the user 103).

The tracking device 106 can be a chip, tile, tag, or other device for housing circuitry and that can be attached to or enclosed within an object such as a wallet, keys, purse, car, pet, or other object that the user 103 may track. The tracking device 106 includes a transmitter for broadcasting signals (such as advertisement packets) that can be detected using a nearby mobile device 102, and a receiver for receiving communications (such as configuration instructions) from a nearby mobile device. In one configuration, the tracking device 106 can broadcast signals periodically or in response to an event (such as a detected motion of the tracking device 106).

The tracking device 106 broadcasts signals such as, for example, advertisement packets. The advertisement packets include information that the mobile device 102 can act on and/or that the mobile device 102 can forward to the tracking system 100 to act on. The tracking device 106 can define a format of the advertisement packets including information included and order thereof. The tracking device 106 can inform the mobile device 102 of the format of the advertisement packets prior to broadcasting the advertisement packets.

An advertisement packet includes a unique tracking device identifier associated with the tracking device 106. The advertisement packet further includes usage information associated with software/hardware components onboard the tracking device 106 such as, for example, one or more sensors, speakers, light emitting diodes (LEDs), displays, etc. The usage information associated with the components onboard the tracking device 106 can include, for example, current settings (e.g., high power or high efficiency notifications, a broadcast frequency of advertisement packets, etc.), power usage information and history, movement information and history, sensor use information and history, etc. The advertisement packet includes battery information associated with a battery at the tracking device 106. The battery information includes, for example, a measure of battery capacity, a measure of remaining battery charge, a measure of discharge current, etc. The power usage information can include a measure of discharge current required to operate each of the one or more sensors, each of the speakers, each of the LEDs, each of the displays, etc. The power usage information can further include a measure of discharge current required for broadcasting each advertisement packet. In some configurations, the advertisement packets include a confirmation signal indicating the tracking device 106 successfully received configuration parameters/instructions from the mobile device 102, and can include a time since or date of last reconfiguration. The advertisement packet further includes a broadcast frequency of the advertisement packets. The broadcast frequency is a measure of how often the tracking device 106 transmits the advertisement packet.

The tracking device 106 can broadcast the advertisement packets at varying broadcast frequencies. For example, the broadcast frequency can range from one advertisement packet every 20 milliseconds to one advertisement packet every 10.24 seconds. In some configurations, the tracking device 106 can adjust the broadcast frequency. For example, the tracking device 106 can adjust the broadcast frequency in steps of 0.625 milliseconds. The tracking device 106 can broadcast the advertisement packets on one or more channels. In some configurations, the tracking device 106 can broadcast the advertisement packets on each of the one or more channels and in other configurations, the tracking device 106 can broadcast the advertisement packets on a subset of the one or more channels.

The tracking device 106 receives reconfiguration instructions from the mobile device 102 via the second network 110. The tracking device 106 dynamically adjusts parameters of advertisement packets (either universally or time-specific) and/or parameters of the components (either universally or time-specific) based on reconfiguration parameters included in the reconfiguration instructions. The tracking device 106 dynamically adjusts the parameters of the advertisement packets by dynamically adjusting the broadcast frequency of the advertisement packets and/or the channels the advertisement packets are broadcasted on. The tracking device 106 dynamically adjusts the parameters of the components by dynamically adjusting a sensitivity of the one or more sensors, a sampling rate of the one or more sensors, a volume of the speakers, a brightness of the LEDs and/or the displays, etc. In some configurations, the tracking device 106 changes power setting (e.g., from a higher power setting to a higher efficiency setting, or vice versa). Changing power settings can include dynamically adjusting the parameters of the advertisement packets, and/or dynamically adjusting the parameters of the components (for all components or subset thereof). In some configurations, the tracking device 106 emits sound from the speakers, emits light from the LEDs, displays an indication on the display, or displays or emits any other type of notification based on the reconfiguration instructions. In some configurations, the tracking device 106 transmits an advertisement packet including a confirmation signal to the mobile device 102 indicating that the tracking device 106 successfully received the reconfiguration parameters/instructions, and can include a time since or date of last reconfiguration.

The mobile device 102 enables the user 103 and/or the tracking system 100 to communicate with the detected tracking device 106. The strength of signals received by the mobile device 102 from the tracking device 106 can be used to determine a distance between the mobile device 102 and the tracking device 106. In some cases, the strength of signals or absence of signals may be used to indicate that the tracking device 106 is not within a threshold proximity of the mobile device 102. The mobile device 102 communicates with tracking devices 106 within a threshold proximity of the mobile device 102.

As noted above, FIG. 1 illustrates the mobile device 102 associated with the user 103. The mobile device 102 can be configured to perform one or more functions with respect to communicating with the tracking device 106 and/or communicating with the tracking system 100. The mobile device 102 receives via the second network 110 advertisement packets from tracking devices 106 within a threshold proximity of the mobile device 102. In one example, the mobile device 102 within a threshold proximity of the tracking device 106 can identify the tracking device 106 (e.g., using the unique tracking device identifier associated with and transmitted by the tracking device 106) based on information included in advertisement packets received from the tracking device 106 via the second network 110.

In some configurations, the mobile device 102 transmits diagnostic information including information from the advertisement packets to the tracking system 100 via the first network 108. The mobile device 102 receives reconfiguration parameters from the tracking system 100 via the first network 108. In response, the mobile device 102 transmits reconfiguration instructions including the reconfiguration parameters to the tracking device 106 via the second network 110. The mobile device 102 can notify the tracking system 100 that the reconfiguration parameters were successfully received by the tracking device 106 and can include a time since or date of last reconfiguration, for instance, in response to an advertisement packet including a confirmation signal received from the tracking device 106. In some embodiments, the steps performed by the mobile device 102 (for instance, the transmitting of diagnostic information to the tracking system 100 or the transmitting of reconfiguration instructions to the tracking device 106) can be performed without involvement of the user 103. Accordingly, the mobile device 102 can communicate with the tracking system 100 and/or the tracking device 106 without bothering and without the involvement of the user 103, thereby improving the experience of the user 103 with the tracking device 106.

In other configurations, the reconfiguring of the tracking device 106 can be performed at the request of the user 103. For example, the mobile device 102 receives input from the user 103 (e.g., via an application executing on the mobile device 102 and/or an interactive graphical user interface displayed by the mobile device 102 to the user 103) representative of information about the user 103, information about a tracking device 106, and/or reconfiguration parameters. In response, the mobile device 102 transmits reconfiguration instructions including the reconfiguration parameters to the tracking device 106 via the second network 110. The mobile device 102 can notify the user 103 that the reconfiguration parameters were successfully received by the tracking device 106 and can include a time since or date of last reconfiguration, for instance, in response to an advertisement packet including a confirmation signal received from the tracking device 106. Furthermore, the mobile device 102 can notify the tracking system 100 of the reconfiguration parameters the user 103 provided as input to the mobile device 102 to transmit to the tracking device 106 and that the reconfiguration parameters were successfully received by the tracking device 106 and can include a time since or date of last reconfiguration.

The diagnostic information includes information that characterizes the tracking device 106 (hereinafter referred to as "tracking device diagnostic information"). For example, the tracking device diagnostic information includes information included in the advertisement packets, or a subset thereof. In some configurations, the diagnostic information further includes information that characterizes the mobile device 102 and/or the user 103 (hereinafter referred to as "mobile device diagnostic information"). The mobile device diagnostic information includes information from the mobile device 102 and/or the user 103. The mobile device diagnostic information includes a unique mobile device identifier associated with the mobile device 102. The mobile device diagnostic information further includes, for example, operating system version, device name, device model, device brand, GPS status, network status/state, network strength, battery information associated with a battery at the mobile device 102, available random access memory (RAM), available storage, etc. The mobile device diagnostic information can further include calendar information including events the user 103 of the mobile device 102 has entered into a calendar on the mobile device 102.

The tracking system 100 can be configured to provide a number of features and services associated with reconfiguring parameters at the tracking devices 106. For example, the tracking system 100 can manage information and/or user profiles associated with the user 103 and the tracking devices 106. In particular, the tracking system 100 can manage information associated with the tracking device 106 within a threshold proximity of the mobile device 102. The tracking system 100 is configured to receive, store, and process diagnostic information, reconfiguration parameters, and/or information about the mobile device 102, information about the user 103, and/or information about the tracking device 106.

The tracking system 100 stores the association between the mobile device 102 and the tracking device 106, along with (for example) a timestamp indicating the time that the mobile device 102 detected the tracking device 106, a distance from the mobile device 102 to the tracking device 106, and the like.

In some configurations, the tracking system 100 receives the diagnostic information from the mobile device 102 via the first network 108. The tracking system 100 processes the received diagnostic information, revises a power consumption model, and determines reconfiguration parameters. The tracking system 100 transmits the reconfiguration parameters to the mobile device 102 via the first network 108.

In some configurations, the tracking system 100 receives a notification (e.g., a confirmation) from the mobile device 102 that the reconfiguration parameters were successfully received by the tracking device 106 including a time since or date of last reconfiguration. In other configurations, the tracking system 100 receives a notification (e.g., a confirmation) from the mobile device 102 that the user 103 provided reconfiguration parameters as input to the mobile device 102 to transmit to the tracking device 106 and that the reconfiguration parameters were successfully received by the tracking device 106 including a time since or date of last reconfiguration.

The reconfiguration parameters refer to communications sent from the tracking system 100 to the mobile device 102 and/or communications sent from the user 103 to the mobile device 102. The reconfiguration parameters include instructions for dynamically adjusting parameters at the tracking device 106 ("reconfiguring the tracking device 106"). The reconfiguration parameters can include the unique tracking device identifier and/or the unique mobile device identifier.

The reconfiguration instructions refer to any communication sent from the mobile device 102 to the tracking device 106 via the second network 110. The reconfiguration instructions include reconfiguration parameters for the tracking device 106. In some configurations, the reconfiguration instructions further include instructions for the tracking device 106 to emit a sound or song from the speakers, to emit light from the LEDs, to display an indication on the display, or to display or emit any other type of notification (such as vibrations).

System Overview

Figure 2:
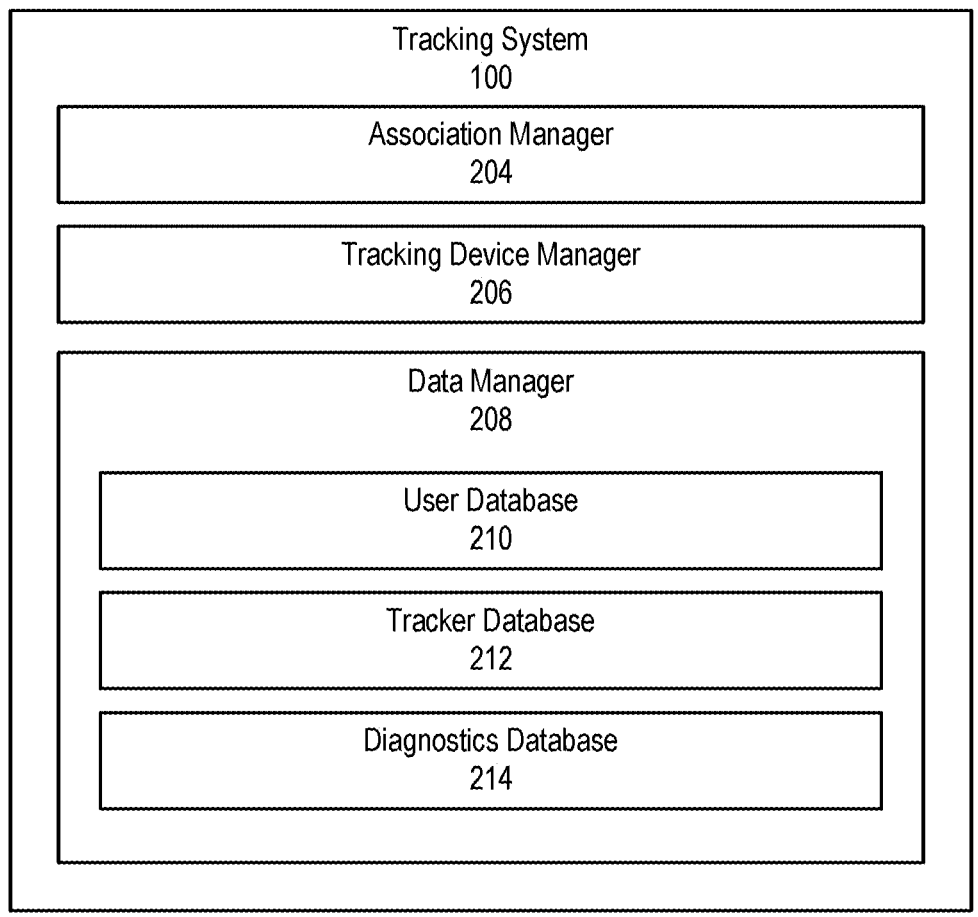
FIG. 2 illustrates a tracking system of the environment of FIG. 1, according to one embodiment.

FIG. 2 illustrates a diagram showing example components of the tracking system 100. As shown, the tracking system 100 includes, but is not limited to, an association manager 204, a tracking device manager 206, and a data manager 208 (herein collectively referred to as "managers 204-208"), each of which can communicate using any suitable communication technologies. It will be recognized that although managers 204-208 are shown to be separate in FIG. 2, any of the managers 204-208 can be combined into fewer managers, such as into a single manager, or divided into more managers as can serve a particular embodiment. The tracking system 100 can be a server, such as a cloud server, a data center, a computer specially configured to perform the functionalities described herein, or any other suitable system.

The association manager 204 receives and processes information about specific tracking devices 106 within a threshold proximity of the mobile device 102 configured to scan for nearby tracking devices 106. The association manager 204 stores the received information in a database (e.g., user database 210 and/or tracker database 212). The association manager 204 associates the tracking device 106 with the mobile device 102. For example, the association manager 204 can store information about the tracking device 106, such as the unique tracking device identifier of the tracking device 106 in association with the unique mobile device identifier for the mobile devices 102 within a threshold proximity of the tracking device 106.

The tracking device manager 206 (hereinafter referred to as "device manager 206") receives and processes diagnostic information from the mobile device 102, revises a power consumption model, determines reconfigurations parameters based on the revised power consumption model, and transmits the reconfiguration parameters to the tracking device 106 via the mobile device 102 within a threshold proximity of the tracking device 106.

The device manager 206 receives the diagnostic information from the mobile device 102 and stores the received diagnostic information in the diagnostics database 214. In some configurations, the diagnostic information includes the tracking device diagnostic information. In one example, the device manager 206 queries a database (e.g., tracker database 212) and identifies the tracking device 106 associated with the received tracking device diagnostic information. For example, the device manager 206 queries the database (e.g., tracker database 212) using a unique tracking device identifier included in the diagnostic information to identify the tracking device 106

In other configurations, the diagnostic information further includes the mobile device diagnostic information. In one example, the tracking device manager 206 further queries a database (e.g., user database 210) and identifies the user 103 associated with the mobile device 102 associated with the received mobile device diagnostic information. For example, the device manager 206 queries the database (e.g., user database 210) using the unique mobile device identifier included in the mobile device diagnostic information to identify the user 103 associated with the mobile device 102.

In configurations in which the diagnostic information includes the tracking device diagnostic information and the mobile device diagnostic information, the device manager 206 parses the diagnostic information into the tracking device diagnostic information and the mobile device diagnostic information. The device manager 206 can store the tracking device diagnostic information in the tracker database 212 and can store the mobile device diagnostic information in the user database 210.

The device manager 206 revises a power consumption model for the tracking device 106 (stored, for instance, within the data manager 208 in association with the tracking device 106) based on the diagnostic information stored in the diagnostics database 214. The power consumption model models various parameters of the tracking device 106 such that the tracking device 106 satisfies a power condition. The power condition can be, for example, that the tracking device 106 lasts for a threshold period of time (e.g., for one year) given the limited battery life of the tracking device 106 and inability to easily replace the battery of the tracking device 106. The power consumption model can include an expected date the power capacity of the tracking device 106 is expected to reach a minimum value (i.e., be drained).

The device manager 206 revises the power consumption model based on the diagnostic information stored in the diagnostic database 214. In revising the power consumption model, the device manager 206 models various parameters of the tracking device 106 such that the tracking device 106 satisfies (and surpasses), the power condition as well as best personalizes an experience of the user 103 with the tracking device 106. The revised power consumption model includes a revised expected date the limited battery life of the tracking device 106 is expected to fall below a threshold power capacity. The device manager 206 revises the power consumption model based on the tracking device diagnostic information stored in the tracker database 212, the mobile device diagnostic information stored in the user database 210, or a combination thereof. For example, the device manager 206 revises the power consumption model based on the tracking device diagnostic information including usage information associated with the one or more sensors, the speakers, the LEDs, the displays, battery information of the tracking device 106, etc. For example, the device manager 206 revises the power consumption model based on current power settings, power usage history, etc.

The device manager 206 determines reconfiguration parameters based on the revised power consumption model. Determining reconfiguration parameters includes either increasing or decreasing power usage and/or efficiency of the tracking device 106 based on the revised power consumption model. The device manager 206 can determine different reconfiguration parameters for different tracking devices 106 associated with different mobile devices 102 and/or different users 103. The device manager 206 transmits the determined reconfiguration parameters to the mobile device 102 via the first network 108. In some configurations, in determining the reconfiguration parameters based on the revised power consumption model, the device manager 206 determines a change in the parameters of the tracking device 106 from current parameters to the determined reconfiguration parameters. In these configurations, the device manager 206 transmits the change in the parameters to the mobile device 102 for transmission to the tracking device 106.

In one specific non-limiting example, the device manager 206 revises a power consumption model based on the tracking device diagnostic information usage information associated with a motion sensor of the tracking device 106 and determines reconfiguration parameters based on the revised power consumption model. Historical usage information associated with the motion sensor can indicate the tracking device 106 does not move much Monday through Friday between the hours of 9 PM to 6 AM, 9 AM to 11:30 AM, 1:30 PM to 5:30 PM, and moves quite significantly Monday through Friday between the hours of 6 AM to 9 AM, 11:30 AM to 1:30 PM, and 5:30 PM to 9 PM. The device manager 206 revises the power consumption model based on the historical usage information associated with the motion sensor. The device manager 206 determines the reconfiguration parameters based on the revised power consumption model. The device manager 206 determines the reconfiguration parameters including an instruction for the tracking device 106 to use a higher efficiency setting for the hours that historically correspond to low amounts of movement and to use a higher power setting for the hours that historically correspond to high amounts of movement. In one example, the higher efficiency setting can include instructions for the tracking device 106 to broadcast the advertisement packets at a lower frequency (e.g., once every 10.24 seconds) and the higher power setting can include instructions for the tracking device 106 to broadcast the advertisement packets at a higher frequency (e.g., once every 20 milliseconds). The higher efficiency setting and the higher power setting can each include additional instructions for controlling the components or functionalities of the tracking device 106. The device manager 206 can determine reconfiguration parameters including instructions for the tracking device 106 to use a higher efficiency setting for some components/aspects of the tracking device 106 and a higher power setting for other components/aspects of the tracking device 106.

In some configurations, the device manager 206 further revises the power consumption model based on the mobile device diagnostic information. Continuing the previous example, the device manager 206 revises the power consumption model further based on the calendar information including events the user 103 of the mobile device 102 is scheduled to attend. The user 103 can have a dinner sched-uled at a restaurant on Wednesday from 8 PM to 10 PM. The historical usage information associated with the motion sensor indicates the tracking device 106 does not move much on a typical Wednesday after 9 PM; however, the calendar information suggests the user 103 will be moving quite significantly from 7:30 PM to 10:30 PM (e.g., including 30 minutes for travel to and from the restaurant). As such, the device manager 206 revises the power consumption model based on the calendar information for the user 103. The device manager 206 determines reconfiguration parameters including instructions for the tracking device 106 to use the higher power setting for the hours the user 103 will be deviating from the behaviors defined by the historical usage information (i.e., from 7:30 PM to 10:30 PM).

The device manager 206 transmits the determined reconfiguration parameters to the tracking device 106 via the mobile device 102 within a threshold proximity of the tracking device 106. In some configurations, the device manager 206 receives a notification from the mobile device 102 indicating the tracking device 106 successfully received the reconfiguration parameters including a time since or date of last reconfiguration. In other configurations, the device manager 206 receives a notification from the mobile device 102 that the user 103 provided reconfiguration parameters as input to the mobile device 102 to transmit to the tracking device 106 and that the reconfiguration parameters were successfully received by the tracking device 106 including a time since or date of last reconfiguration. The device manager 206 can further revise the power consumption model based on the received notification.

In one example, the device manager 206 stores the reconfiguration parameters. The device manager 206 can set a flag in a database (e.g., tracker database 212 and/or user database 210) indicating that the tracking device 106 has pending reconfiguration parameters. Setting a flag for a tracking device 106 can include storing and/or associating a value associated with the tracking device 106 that indicates that the tracking device 106 has pending reconfiguration parameters. This can include setting a flag, marker, digital value, or other indication that the tracking device 106 has pending reconfiguration parameters and maintaining or storing the indication of the associated tracking device 106 on the tracking system 100 (e.g., on a database). In response to the receipt by the association manager 204 of a signal from the mobile device 102 indicating that the mobile device 102 is within a threshold proximity of the tracking device 106, the association manager 204 can query the device manager 206 to determine if a flag indicating pending reconfiguration parameters are set for the tracking device 106. In response to such a determination, the device manager 206 can transmit the reconfiguration parameters to the mobile device 102. Upon receiving a notification (e.g., a confirmation) indicating that the tracking device 106 has received the reconfiguration parameters (or in response to transmitting the reconfiguration parameters to the mobile device 102), the device manager 206 can remove the flag in the database indicating the tracking device 106 has pending reconfiguration parameters.

The data manager 208 stores and manages information associated with users, mobile devices, tracking devices, reconfiguration parameters and other data that can be stored and/or maintained in a database related to reconfiguration parameters. As shown, the data manager 208 may include, but is not limited to, a user database 210, a tracker database 212, and a diagnostics database 214. It will be recognized that although databases and data within the data manager 208 are shown to be separate in FIG. 2, any of the user database 210, the tracker database 212, and the diagnostics database 214 may be combined in a single database or manager, or divided into more databases or managers as may serve a particular embodiment.

The user database 210 stores data related to various users. For example, the user database 210 can store the information from the user 103 and/or the information from the mobile device 102. The information from the user 103 and/or the information from the mobile device 102 can be associated with one or more respective tracking devices 106, or can be stored without an association to a particular tracking device 106. For example, the user 103 can provide information and permit performance of tracking functions on the mobile device 102 without owning or being associated with the tracking device 106. The user database 210 can also include information about one or more mobile devices 102 or other electronic devices associated with a particular user 103.

The tracker database 212 stores data related to tracking devices 106. For example, the tracker database 212 can store the information from the advertisement packets. The tracker database 212 can further include tracking data for any tracking device 106. Tracking data can include unique tracking device identifiers associated with individual tracking devices 106. The tracking device identifiers can be associated with mobile devices 102 within a threshold proximity of the tracking devices 106.

The tracker database 212 and/or the user database 210 can include information describing permissions and permission levels associated with a particular user 103 and/or tracking device 106. For example, the tracker database 212 and/or the user database 210 can identify additional users 103 with shared permissions (such as access permissions, communication permissions, and the like) for a tracking device 106.

The diagnostics database 214 stores diagnostic information. In some configurations, the diagnostics database 214 stores the tracking device diagnostic information and in other configurations, the diagnostic database 214 stores the tracking device diagnostic information and the mobile device diagnostic information.

Figure 3:
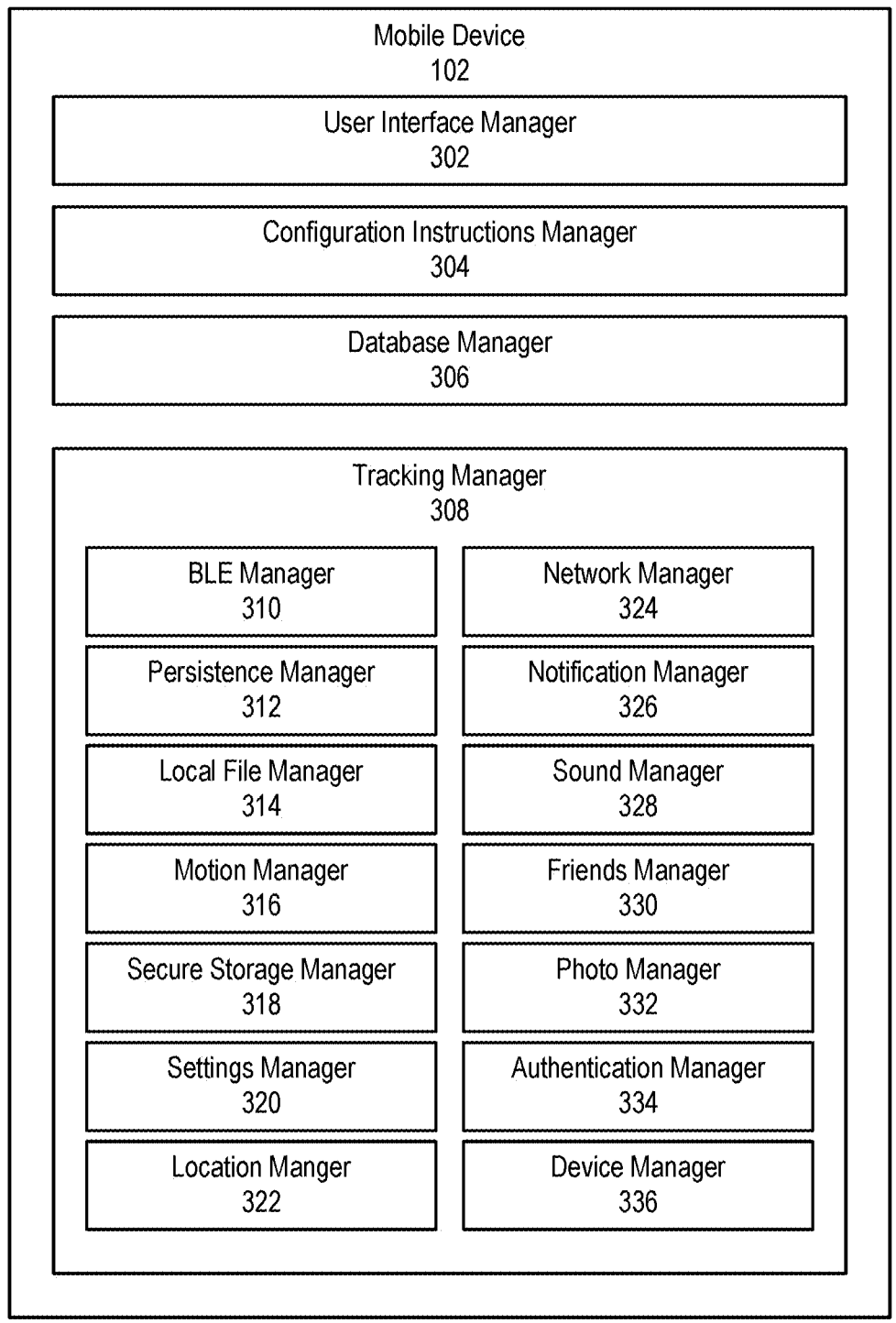
FIG. 3 illustrates a mobile device of the environment of FIG. 1, according to one embodiment.

FIG. 3 illustrates a diagram showing example components of the mobile device 102. As shown, the mobile device 102 may include, but is not limited to, a user interface manager 302, a configuration instructions manager 304, a database manager 306, and a tracking manager 308, each of which may be in communication using any suitable communication technologies. It will be recognized that although managers 302-308 are shown to be separate in FIG. 3, any of the managers 302-308 may be combined into fewer managers, such as into a single manager, or divided into more managers as may serve a particular embodiment.

The user interface manager 302 facilitates the user 103 in providing data to and access to data on the tracking system 100 and/or tracking device 106. Further, the user interface manager 302 provides a user interface by which the user 103 can communicate with tracking system 100 and/or tracking device 106 via mobile device 102. The user interface manager 302 can receive reconfiguration parameters from the user 103 to transmit to the tracking device 106.

The configuration instructions manager 304 (hereinafter referred to as "instructions manager 304") receives and processes reconfiguration parameters and transmits reconfiguration instructions. In some configurations, the mobile device 102 receives reconfiguration parameters from the tracking system 100 via the first network 108, the instructions manager 304 processes the received reconfiguration parameters, and transmits reconfiguration instructions to the tracking device 106 via the second network 110. The instructions manager 304 can notify the tracking system 100 that the reconfiguration parameters were successfully received by the tracking device 106 and can include a time since or date of last reconfiguration, for instance, in response to a confirmation signal received from the tracking device 106. The instructions manager 304 can notify the tracking system 100 via the first network 108. In other configurations, the mobile device 102 receives reconfiguration parameters from the user 103 via the user interface manager 302, and the instructions manager 304 processes the received reconfiguration parameters and transmits reconfiguration instructions to the tracking device 106 over the second network 110. The instructions manager 304 can notify the user 103 that the reconfiguration parameters were successfully received by the tracking device 106 and can include a time since or date of last reconfiguration. The instruction manager 304 can notify the user 103 via the user interface manager 302. Furthermore, the instructions manager 304 can notify the tracking system 100 of the reconfiguration parameters the user 103 provided as input via the user interface manager 302 to transmit to the tracking device 106 and that the reconfiguration parameters were successfully received by the tracking device 106 and can include a time since or date of last reconfiguration.

The database manager 306 maintains data related to the user 103, the tracking device 106, the reconfiguration parameters/instructions, or other data that can be used for communicating with a tracking device 106. Further, the database manager 306 maintains any information that can be accessed using any other manager on the mobile device 102.

The tracking manager 308 includes a tracking application (e.g., a software application) for communicating with the tracking device 106 associated with the user 103. For example, the tracking manager 308 can be one configuration of a tracking application installed on the mobile device 102 that provides the functionality for communicating with the tracking device 106. As shown, the tracking manager 308 can include, but is not limited to, a Bluetooth Low Energy (BLE) manager 310, a persistence manager 312, a local files manager 314, a motion manager 316, a secure storage manager 318, a settings manager 320, a location manager 322, a network manager 324, a notification manager 326, a sound manager 328, a friends manager 330, a photo manager 332, an authentication manager 334, and a device manager 336. Thus, the tracking manager 308 may perform any of the functions associated with managers 310-338, described in additional detail below.

The BLE manager 310 can be used to manage communication with one or more tracking devices 106. The persistence manager 312 can be used to store logical schema information that is relevant to the tracking manager 308. The local files manager 314 can be responsible for managing all files that are input or output from the mobile device 102. The motion manager 316 can be responsible for all motion management required by the tracking manager 308. The secure storage manager 318 can be responsible for storage of secure data, including information such as passwords and private data that would be accessed through this sub-system. The settings manager 320 can be responsible for managing settings used by the tracking manager 308. Such settings can be user controlled (e.g., user settings) or defined by the tracking manager 308 for internal use (e.g., application settings) by a mobile device 102 and/or the tracking system 100. The location manager 322 can be responsible for all location tracking done by the tracking manager 308. For example, the location manager 322 can manage access to the location services of the mobile device 102 and works in conjunction with other managers to persist data.

The network manager 324 may be responsible for all Internet communications from the tracking manager 308. For example, the network manager 324 can mediate all Internet API calls for the tracking manager 308. The notification manager 326 can be responsible for managing local and push notifications required by the tracking manager 308. The sound manager 328 can be responsible for playback of audio cues by the tracking manager 308. The friends manager 330 can be responsible for managing access to contacts and the user's social graph. The photo manager 332 can be responsible for capturing and managing photos used by the tracking manager 308. The authentication manager 334 can be responsible for handling the authentication (e.g., sign in or login) of users. The authentication manager 334 can also include registration (e.g., sign up) functionality. The authentication manager 334 can further coordinate with other managers to achieve registration functionality. The device manager 336 can be responsible for managing the devices discovered by the tracking manager 308. The device manager 336 can further store and/or maintain the logic for algorithms related to device discovery and update.

Interaction

Figure 4:
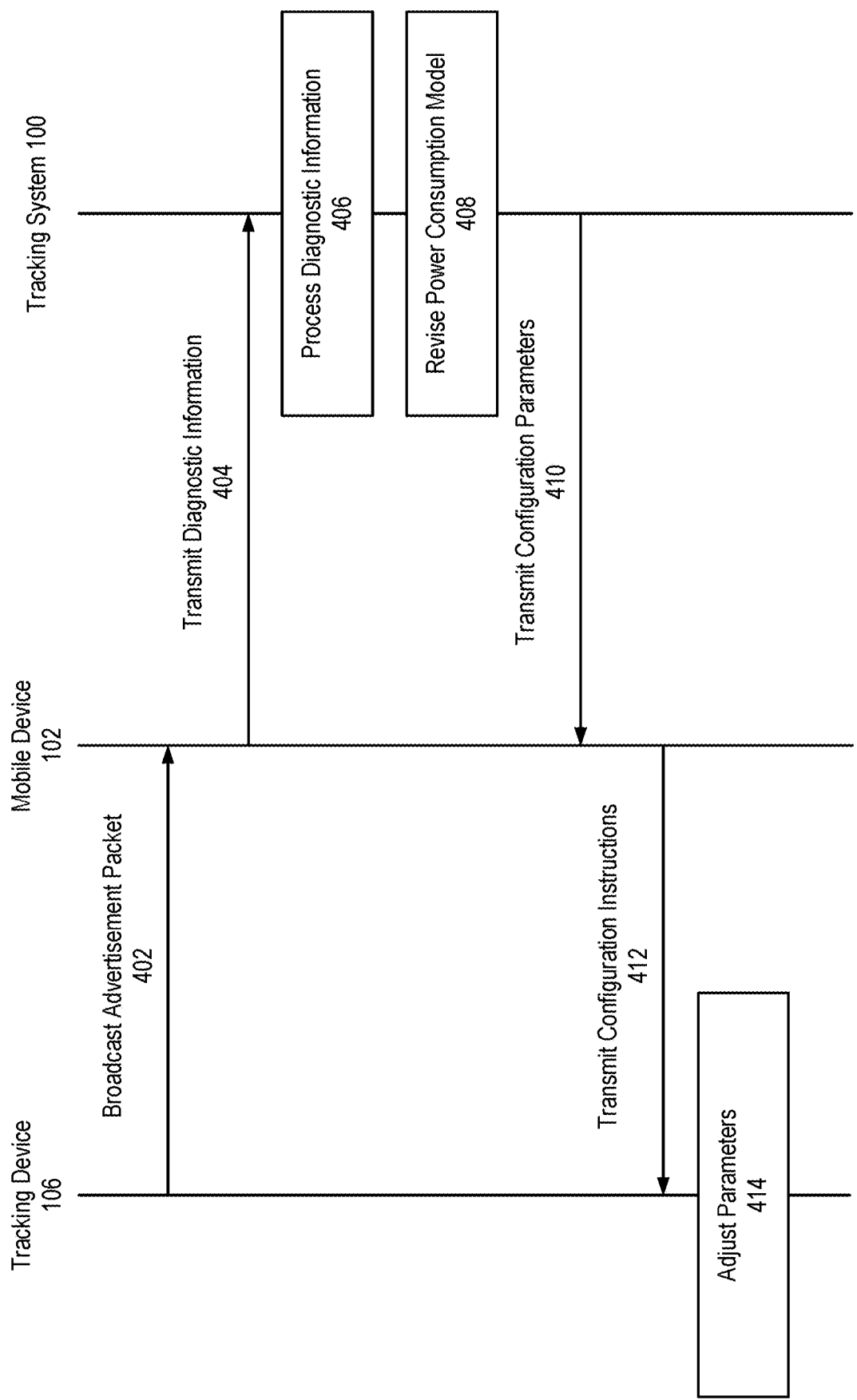
FIG. 4 illustrates an interaction diagram for sending configuration parameters from a tracking system to a tracking device via a mobile device, according to one embodiment.

FIG. 4 illustrates an interaction diagram for sending reconfiguration parameters from a tracking system 100 to a tracking device 106 via a mobile device 102, according to one embodiment.

The tracking device 106 broadcasts 402 at least one advertisement packet. The advertisement packet can include a unique device identifier associated with the tracking device 106, usage information associated with software/hardware components onboard the tracking device 106, a broadcast frequency, etc.

The mobile device 102 receives via the second network 110 the advertisement packet from tracking devices 106 within a threshold proximity of the mobile device 102. The mobile device 102 transmits 404 via the first network 108 diagnostic information to the tracking system 100. The diagnostic information includes information that characterizes usage behaviors or properties of the tracking device 106, including information included in the received advertisement packet. In some configurations, the diagnostic information further includes mobile device diagnostic information (such as information describing usage behaviors or properties of the mobile device and/or a user of the mobile device).

The tracking system 100 receives via the first network 108 the diagnostic information from the mobile device 102. The tracking system 100 processes 406 the received diagnostic information including the tracking device diagnostic information. Processing 406 the tracking device diagnostic information includes storing the tracking device diagnostic information, querying a database to identify the tracking device 106 associated with the received tracking device diagnostic information, etc. In configurations in which the diagnostic information includes the tracking device diagnostic information and the mobile device diagnostic information, processing 406 the received diagnostic information can further include parsing the diagnostic information into the tracking device diagnostic information and the mobile device diagnostic information, querying a database to identify the mobile device 102 and/or the user 103 associated with the diagnostic information, etc.

The tracking system 100 revises 408 a power consumption model for the tracking device 106 based on the processed diagnostic information. Revising a power consumption model can include determining a length of time the tracking device can continue to operate at historical behaviors in view of a current tracking device battery capacity, and if the determined length of time does not exceed a minimum threshold length of time (the "power condition", such as operation for a full year since the tracking device was activated), can include modeling various parameters of the tracking device 106 such that the tracking device 106 satisfies and/or surpasses the power condition (extends the length of time the tracking device can operate to exceed, for instance, the "operation for a full year" criteria). The tracking system 100 determines the reconfiguration parameters based on the revised power consumption model. The reconfiguration parameters include instructions for dynamically adjusting parameters at the tracking device 106. In some configurations, the device manager 206 determines the reconfiguration parameters further based on the mobile device diagnostic information stored in the user database 210. The tracking system 100 transmits 410 the determined reconfiguration parameters to the mobile device 102 via the first network 110.

The mobile device 102 receives reconfiguration parameters from the tracking system 100 via the first network 108. The mobile device 102 transmits 412 reconfiguration instructions including the reconfiguration parameters to the tracking device 106 via the second network 110. In some configurations, the reconfiguration instructions further include instructions for the tracking device 106 to emit a sound or song from the speakers, to emit light from the LEDs, to display an indication on the display, or to display or emit any other type of notification (such as vibrations).

The tracking device 106 receives the reconfiguration instructions from the mobile device 102 via the second network 110. The tracking device 106 dynamically adjusts 414 parameters of the advertisement packets and/or parameters of the components, based on reconfiguration parameters included in the reconfiguration instructions. In one example, the tracking device 106 dynamically adjusts 414 parameters of the advertisement packets to broadcast at a lower frequency, adjusts 414 the parameters of the components to emit sound from the speakers at a higher volume, emit light from the LEDs at a lower brightness, vibrate at a higher setting for a longer duration, etc.

It should be noted that in some embodiments, the tracking device 106 of FIG. 1 is a mobile device 102 configured to act as a tracking device 106, for instance after the passage of a threshold amount of time without receiving an input from the user 103, without receiving a communication from the tracking system 100, without detecting movement, or the like. In such embodiments, the mobile device 102 is any connected device (e.g., personal computer, laptop, tablet, etc.) capable of communicating with the tracking system 100 via the first network 108. In such embodiments, the reconfiguration instructions/parameters can be sent to the mobile device 102 acting as the tracking device 106, enabling the adjustment of parameters at the mobile device 102, beneficially achieving, and surpassing, the power condition and personalizing the experience of the user 103 with the mobile device 102. In some embodiments, the mobile device 102 can be marked as lost, for instance in response to a designation of the mobile device 102 as lost by the user 103 of the mobile device 102, in response the passage of a threshold amount of time without a communication between the tracking system 100 and the mobile device 102, in response to the passage of a threshold amount of time without a detected movement of the mobile device 102, or based on any other suitable factors. In some embodiments, the mobile device 102 is configured to act as the tracking device 106 and can broadcast advertisement parameters. In such embodiments, when a second user 103 with another mobile device 102 comes within a threshold proximity of the mobile device 102 configured as the tracking device 106, the another mobile device 102 of the second user 103 can receive the broadcasted advertisement packet, and can report the location of the mobile device 102 to the tracking system 100. In turn, the tracking system 100 can provide a notification to the user 103 that the mobile device 102 configured to act as the tracking device 106 has been found, the location of the mobile device 102 configured to act as the tracking device 106, and the like.

In some embodiments, the mobile device 102 is configured to act as the tracking device 106 and can emit a notification in response to an input by the user 103 at the tracking device 106. For instance, the user 103 can interact with a button, switch, dial, displayed interface, or other interface at the tracking device 106, which can provide reconfiguration instructions to the mobile device 102 to ring. Such embodiments, beneficially allow the user 103 to locate the mobile device 102 from the tracking device 106. In some embodiments, the tracking device 106 can, in response to a communication (e.g., reconfiguration parameters) received from the mobile device 102 or a lack thereof, broadcast one of a plurality of notifications and, for example, include the one of the plurality of notifications in the advertisement packet. For example, the tracking device 106 can emit a first ringtone in response to failing to receive, from the mobile device 102, a response to reconfiguration instructions sent by the tracking device 106. Continuing with this example, the tracking device 106 can emit a second ringtone if the tracking device 106 is communicatively coupled with the mobile device 102, can emit a third ringtone in response to detecting the mobile device 102 but being unable to communicatively couple to the mobile device 102, and emit a fourth ringtone in response to detecting the mobile device 102 but before attempting to communicatively couple to the mobile device 102, can emit a fifth ringtone in response to actively attempting to communicatively couple to the mobile device 102, or any combination or sub-combination thereof.

ADDITIONAL CONSIDERATIONS

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Any of the devices or systems described herein can be implemented by one or more computing devices. A computing device can include a processor, a memory, a storage device, an I/O interface, and a communication interface, which may be communicatively coupled via communication infrastructure. Additional or alternative components may be used in other embodiments. In particular embodiments, a processor includes hardware for executing computer program instructions by retrieving the instructions from an internal register, an internal cache, or other memory or storage device, and decoding and executing them. The memory can be used for storing data or instructions for execution by the processor. The memory can be any suitable storage mechanism, such as RAM, ROM, flash memory, solid state memory, and the like. The storage device can store data or computer instructions, and can include a hard disk drive, flash memory, an optical disc, or any other suitable storage device. The I/O interface allows a user to interact with the computing device, and can include a mouse, keypad, keyboard, touch screen interface, and the like. The communication interface can include hardware, software, or a combination of both, and can provide one or more interfaces for communication with other devices or entities.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, compuationally, or logically, are understood to be implemented by computer programs or equivalent electrical circuits, microcode, or the like. Furthermore, it has also proven convenient at times, to refer to these arrangements of operations as components, without loss of generality. The described operations and their associated components may be embodied in software, firmware, hardware, or any combinations thereof.

Any of the steps, operations, or processes described herein may be performed or implemented with one or more hardware or software components, alone or in combination with other devices. In one embodiment, a software component is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments of the disclosure is intended to be illustrative, but not limiting, of the scope of the disclosure, which is set forth in the following claims.

What is claimed is:

1. A method comprising:
  receiving, by a tracking server, tracking device diagnostic information for a tracking device, historical usage information for the tracking device, projected usage information for the tracking device, and user device diagnostic information, wherein the projected usage information comprises an indication of future usage of the tracking device for a specified period of time, and wherein the historical usage information comprises an indication of past usage of the tracking device corresponding at least in part to the specified period of time;

retrieving, by the tracking server, a power consumption model for the tracking device based on the tracking device diagnostic information;

revising, by the tracking server, the power consumption model for the tracking device based on the tracking device diagnostic information and the user device diagnostic information, wherein revising the power consumption model comprises:
  determining, based at least on the historical usage information of the tracking device and a current battery capacity of the tracking device, a length of time the tracking device can continue to operate;
  determining that the length of time does not satisfy a first power condition out of one or more power conditions; and
  modeling one or more parameters of the tracking device such that the tracking device satisfies the first power condition;

determining, by the tracking server and based at least on the historical usage information and the projected usage information, a projected deviation from past usage during the specified period of time;

determining, by the tracking server, reconfiguration instructions for the tracking device based on the revised power consumption model and the determined deviation from past usage during the specified period of time, wherein the reconfiguration instructions are selected to cause the tracking device to satisfy the one or more power conditions during the specified period of time of the projected usage information; and providing, by the tracking server, the reconfiguration instructions to the tracking device.

2. The method of claim 1, further comprising:
storing, by the tracking server in the database associated with the tracking server, tracking device diagnostic information for one or more additional tracking devices respectively associated with one or more additional user devices; and in response to determining the reconfiguration instructions for the tracking device, updating, by the tracking server, the stored tracking device diagnostic information for the tracking device in the database associated with the tracking server.

3. The method of claim 2, further comprising:
receiving, by the tracking server, a confirmation message indicating that the tracking device has been reconfigured in accordance with the reconfiguration instructions; and in response to receiving the confirmation message, updating, by the tracking server, the stored tracking device diagnostic information for the tracking device.

4. The method of claim 1, wherein the tracking server receives the tracking device diagnostic information and the user device diagnostic information from a user device via a first network; and
wherein the tracking server provides the reconfiguration instructions to the tracking device via the first network.

5. The method of claim 4, wherein the user device receives the tracking device diagnostic information from the tracking device via a second network, the second network having a shorter communicative range than the first network.

6. The method of claim 1, wherein the tracking server receives the tracking device diagnostic information and user device diagnostic information from a first user device; and
wherein the tracking server provides the reconfiguration instructions to the tracking device via a second user device.

7. The method of claim 1, wherein the tracking device diagnostic information comprises one or more of:
information that characterizes the tracking device;
a unique tracking device identifier for the tracking device;
usage information associated with one or more components of the tracking device; and
battery information of the tracking device.

8. The method of claim 1, wherein the user device diagnostic information comprises one or more of:
information that characterizes the user device;
information that uniquely identifies the user device;
a network status associated with the user device;
battery information associated with the user device;
information that characterizes a user of the user device; and
information that uniquely identifies the user of the user device.

9. The method of claim 1, wherein the reconfiguration instructions comprise one or more of:
an instruction to modify power consumption of the tracking device;
operating parameters for one or more components of the tracking device;
a time period of effectiveness for the reconfiguration instructions; and
an instruction to configure the tracking device to provide an output in response to receiving the reconfiguration instructions.

10. The method of claim 1, wherein the tracking server provides the reconfiguration instructions to the tracking device without input from a user associated with the tracking device or user device.

11. The method of claim 1, further comprising:
receiving, by the tracking server, user requested configuration instructions for the tracking device; and
determining, by the tracking server, the reconfiguration instructions for the tracking device based on the user requested configuration instructions.

12. The method of claim 1, wherein the tracking server receives the tracking device diagnostic information or user device diagnostic information in response to a request from a user of a user device.

13. The method of claim 1, wherein the tracking server receives the tracking device diagnostic information periodically.

14. The method of claim 1, wherein revising, by the tracking server, the power consumption model for the tracking device based on the tracking device diagnostic information and the user device diagnostic information further comprises:
modeling an effect of one or more reconfiguration instructions with respect to the one or more power conditions.

15. The method of claim 1, wherein the revised power consumption model includes a revised expected date a battery capacity of the tracking device is expected to fall below a threshold power capacity.

16. The method of claim 1, wherein the projected usage information comprises an indication of future movement of the tracking device and the historical usage information comprises an indication of past movement of the tracking device corresponding at least in part to the specified period of time.

17. The method of claim 1, wherein the projected usage information is based at least on part on calendar information associated with a user of the tracking device.

18. A system comprising:
one or more processors; and
one or more computer-readable non-transitory storage media coupled to one or more of the processors and comprising instructions operable when executed by one or more of the processors to cause the system to perform operations comprising:
receiving tracking device diagnostic information for a tracking device, historical usage information for the tracking device, projected usage information for the tracking device, and user device diagnostic information, wherein the projected usage information comprises an indication of future usage of the tracking device for a specified period of time, and wherein the historical usage information comprises an indication of past usage of the tracking device corresponding at least in part to the specified period of time;
retrieving a power consumption model for the tracking device based on the tracking device diagnostic information;
revising the power consumption model for the tracking device based on the tracking device diagnostic information and the user device diagnostic information, wherein revising the power consumption model comprises:
determining, based at least on the historical usage information of the tracking device and a current battery capacity of the tracking device, a length of time the tracking device can continue to operate;
determining that the length of time does not satisfy a first power condition out of one or more power conditions; and
modeling one or more parameters of the tracking device such that the tracking device satisfies the first power condition;
determining, based at least on the historical usage information and the projected usage information, a projected deviation from past usage during the specified period of time;
determining reconfiguration instructions for the tracking device based on the revised power consumption model and the determined deviation from past usage during the specified period of time, wherein the reconfiguration instructions are selected to cause the tracking device to satisfy the one or more power conditions during the specified period of time of the projected usage information; and
providing the reconfiguration instructions to the tracking device.

19. One or more computer-readable non-transitory storage media embodying software that is operable when executed to perform operations comprising:
receiving tracking device diagnostic information for a tracking device, historical usage information for the tracking device, projected usage information for the tracking device, and user device diagnostic information, wherein the projected usage information comprises an indication of future usage of the tracking device for a specified period of time, and wherein the historical usage information comprises an indication of past usage of the tracking device corresponding at least in part to the specified period of time;
retrieving a power consumption model for the tracking device based on the tracking device diagnostic information;
revising the power consumption model for the tracking device based on the tracking device diagnostic information and the user device diagnostic information, wherein revising the power consumption model comprises:
determining, based at least on the historical usage information of the tracking device and a current battery capacity of the tracking device, a length of time the tracking device can continue to operate;
determining that the length of time does not satisfy a first power condition out of one or more power conditions; and
modeling one or more parameters of the tracking device such that the tracking device satisfies the first power condition;
determining, based at least on the historical usage information and the projected usage information, a projected deviation from past usage during the specified period of time;
determining reconfiguration instructions for the tracking device based on the revised power consumption model and the determined deviation from past usage during the specified period of time, wherein the reconfiguration instructions are selected to cause the tracking device to satisfy the one or more power conditions during the specified period of time of the projected usage information; and
providing the reconfiguration instructions to the tracking device.

20. The computer-readable non-transitory storage media of claim 19, wherein the software is further operable when executed to perform operations comprising:
storing, in the database, tracking device diagnostic information for one or more additional tracking devices respectively associated with one or more additional user devices; and
in response to determining the reconfiguration instructions for the tracking device, updating the stored tracking device diagnostic information for the tracking device in the database associated with the tracking server.

* * * * *